N. WILSON.
Surveyor's Combined Protractor and Scale.

No. 224,811.    Patented Feb. 24, 1880.

Witnesses
Fred G. Dieterich
George Binkenburg

Inventor
Nathaniel Wilson
PER. W. J. Johnston
Attorney

UNITED STATES PATENT OFFICE.

NATHANIEL WILSON, OF CHILLICOTHE, OHIO.

SURVEYOR'S COMBINED PROTRACTOR AND SCALE.

SPECIFICATION forming part of Letters Patent No. 224,811, dated February 24, 1880.

Application filed April 25, 1879.

*To all whom it may concern:*

Be it known that I, NATHANIEL WILSON, of Chillicothe, in the county of Ross and State of Ohio, have invented a new and useful Instrument called Surveyor's Combined Protractor and Scale, which is fully described in the following specification.

My invention relates to improvements in protractors; and it consists in making a graduated guide-arm removably attached to the diameter-bar of the inner circle of the protractor, and provided with shouldered end extensions, which pass over the outer and inner circles of the protractor.

Figure 1:
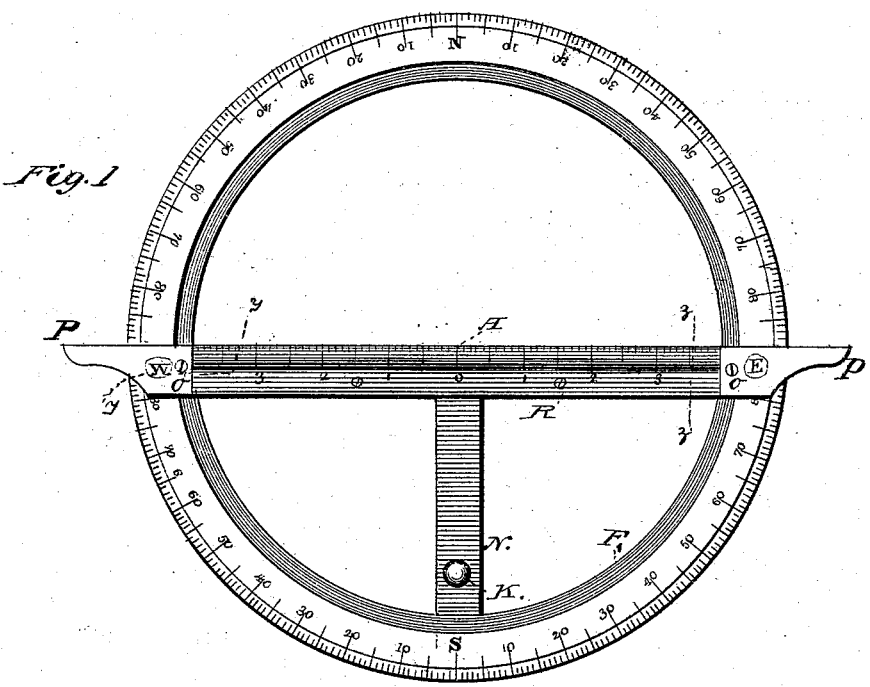
Figure 3:
Figure 2:
Figure 5:
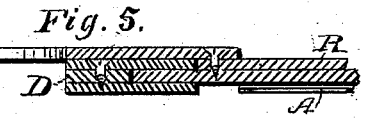
Figure 4:
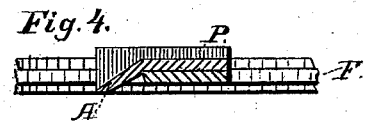

In the drawings, Figure 1 is a plan view of my invention. Fig. 2 is a side elevation. Fig. 3 is a vertical section. Fig. 4 is a section on the line $zz$, Fig. 1, showing the beveled edge of the under side of the removable guide-arm. Fig. 5 is a section on the line $yy$, showing the guide-arm extending over the outer and inner circles.

My protractor is formed by uniting two concentric circles of brass, nickel, or other suitable material by rivets or other means, an annular ring, D, whose width is less than that of the circles being interposed between them, thus forming an annular groove within the interior circumference of the circle for the accommodation of an inner circle, F.

On the rim of the outer circle, which may be of any convenient width, are marked the degrees of the quadrant, beginning with zero (0) and counting ninety degrees to the E. or W. points.

A guide arm or bar, R, graduated to linear measurement, such as feet, rods, poles, &c., is removably attached to and moves with the diameter-arm of the inner circle. It may be secured to said arm in any convenient way.

The ends of the guide-arm are extended so as to form guide-flanges P, which may be graduated and provided with a micrometer-scale. These flanges project a sufficient distance beyond the outer edge of the outer circle to give direction to a course or line which extends beyond the limits of the circles, so that by simply sliding the instrument along the course or line thus prolonged we may preserve and complete the measurement of the true course.

The inner face of the guide-arm is beveled and the under face is also beveled, and is extended below the diameter-arm, so that it rests clear of the inner circle and diameter-arm, but directly on the paper, and thus gives a true and accurate bearing for a right-line pen, pencil, or picker point. Where the guide-arm passes over the circle it is provided with shoulders, which form recesses or grooves for the passage of the circles.

By making the guide-arm removable it can be replaced by a new one without putting in a new inner circle, as required in the present form of protractors, when the beveled edge of the guide-arm becomes indented, rough, &c.

An arm, N, extends from the diameter-arm to the opposite side of the inner circle and gives stability to the component parts. It is provided with a handle or knob, K, for revolving the inner circle and guide-arm.

The method of plotting is as follows: First adjust the instrument so that the straight-edge of the guide-arm stands directly over the north and south points of the outer circle and the center A of the starting-point. For instance, the calls of a survey are forty poles north, thence twenty poles north forty degrees east, &c., the instrument is placed upon the paper, and, commencing at the center or starting-point, a line is drawn by the guide-arm, which serves as a rule, forty poles north by the scale. The instrument is then, without any alteration of its relative points, moved or caused to slide over the paper until the center A is over the terminal point of the line. The inner circle is then revolved until the flange of the guide-arm marks forty degrees east on the scale of the outer circle, and a line showing twenty poles on the scale is drawn.

The same operation is repeated until the calls are complied with and the starting-point reached, thereby accomplishing in a simple and easy manner with this instrument what has heretofore, under the ordinary methods, required several instruments and much time, care, and labor.

Having thus described my invention, what

I claim, and desire to secure by Letters Patent, is—

In a protractor, the combination of an outer circle graduated to degrees, an inner circle having one or more diameter-arms, with a detachable guide-arm, R, graduated to linear measurement, and provided with shouldered flanges P, extending over the inner and outer circles, substantially as described, and for the purpose set forth.

NATHANIEL WILSON.

Attest:
 W. E. EVANS,
 C. T. CARRIER.